June 5, 1956     J. A. FEAY ET AL     2,749,089
TRANSMISSION CRADLE
Filed Jan. 13, 1954
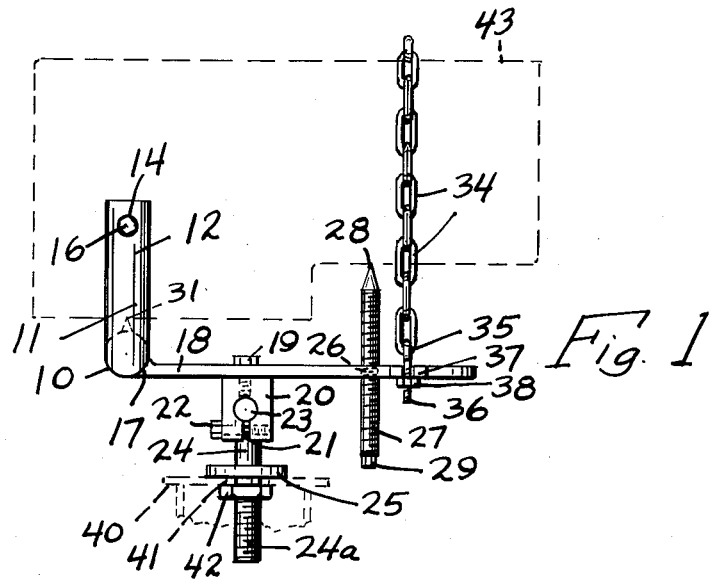
Fig. 1
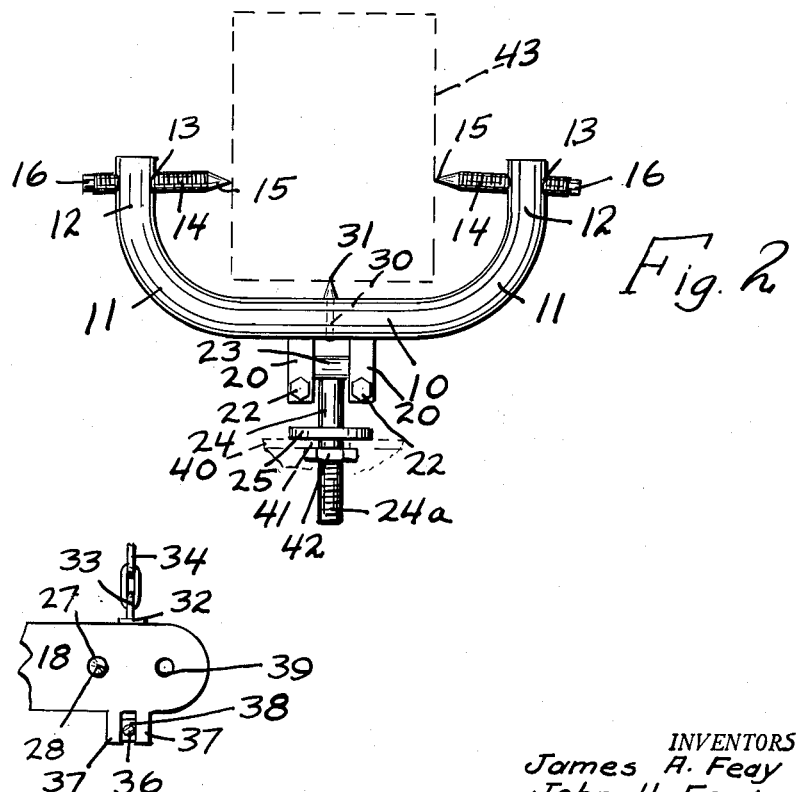
Fig. 2
Fig. 3
INVENTORS
James A. Feay
BY John H. Feay
Alex N. Feay
Sam J. Slotsky
ATTORNEY

2,749,089

TRANSMISSION CRADLE

James A. Feay, John H. Feay, and Alex N. Feay, Sioux Falls, S. Dak.

Application January 13, 1954, Serial No. 403,810

2 Claims. (Cl. 254—134)

Our invention relates to a transmission cradle.

An object of our invention is to provide a device for rigidly and securely clamping a transmission of an automobile, so that such transmission can be removed from the vehicle or replaced, or can be moved to a selected position, and whereby the transmission can be raised or lowered by means of attaching our type of cradle to a standard hydraulic or mechanical type of jack.

A further object of our invention is to provide means whereby the cradle can be securely attached to said jack, and to provide further means wherein varied sizes of transmission casings can be accommodated.

A further object of our invention is to provide a cradle which can be adjustably positioned angularly.

With these and other objects in view, our invention consists in the construction, arrangement, and combination of the various parts of our device, whereby the objects contemplated are attained, as hereinafter more fully set forth, pointed out in our claims, and illustrated in the accompanying drawings, in which:

Figure 1 is a side elevation of the cradle,

Figure 2 is a forward view of Figure 1, and

Figure 3 is a detail.

Our invention contemplates the provision of an economically manufactured transmission cradle which will provide means for rigidly attaching the cradle to a standard jack so that the transmission can be removed for working upon the same, and can be easily re-attached to the vehicle portions.

We have used the character 10 to designate a horizontally and laterally positioned bar which is curved at 11 into the vertical portions 12, and threadably engaged with the portions 12 at 13 are the slightly angularly inclined studs 14 having the pointed ends 15 and the hexagon tool engaging ends 16.

Welded to the member 10 at 17 is a horizontally longitudinally positioned flat bar 18 to which are bolted at 19 the blocks 20, the blocks 20 having the slotted portions 21 through which pass the tightening bolts 22 and received within the blocks 20 is a transverse circular rod 23 to which is attached the integral vertically positioned stud portion 24 terminating in the threaded end 24a. Integrally attached to the member 24 is the circular flange 25.

Threadably engaged at 26 with the member 18 is a vertically positioned stud 27 having the pointed end 28 and the tool engaging end 29.

Attached to the member 10 is a further vertically positioned member 30 having the pointed end 31.

Also attached to the member 18 at 32 is a hook 33 which is open at its lower portion to allow selective positioning of the links 34, which links 34 are provided in the form of a continuous chain, to which the chain is attached at 35 the threaded stud 36 which passes between the ears 37, which ears 37 are attached to the member 18, and attached to the stud 36 is a nut 38. A further threaded opening at 39 can be used to permit adjustable positioning of the stud 27.

The device is used in the following manner. The cradle can first be attached to the standard jack portion 40, this portion being the usual plate or other member which is raised or lowered by the standard mechanical or hydraulic jack used in automobile work, the member 40 including the opening 41 in which the stud 24 is inserted, and a nut 42 is engaged with the threads 24a and turned against the member 40 to thereby tighten the cradle in secure position to the jack. The studs 14 can then be turned inwardly so that they will contact the sides of the transmission, the transmission being indicated generally in dotted lines by the character 43, the transmission resting substantially as shown on the points 31 and 28. Figure 2 illustrates the forward view of the arrangement showing the penetration of the various points 15 and 31, and shows the arrangement just before the chain members 34 have been passed around the transmission for securing the same.

The chain member comprising the links 34 is then wrapped around the transmission 43 with the stud 36 being placed between the ears 37 and the nut 38 being tightened, and next, the end 29 of the stud 27 can be struck a slight blow with a hammer to cause a slight penetration of the point 28 into the transmission, whereupon the nut 38 is tightened slightly again if necessary, this arrangement thereby providing a firm retention of the transmission at the various points so that it cannot become dislodged in a lateral or longitudinal movement, it being noted that it will thus be firmly clamped against movement in any direction.

By loosening the bolts 22 etc., the cradle can also be positioned angularly with respect to the stud portion 24, which is desirable in many cases when manipulating the transmission.

After the transmission is unbolted from the balance of the vehicle portions, it can thus be lowered gradually by means of the jack, and it will remain in firmly retained position during such lowering action and can be removed to a work bench or the like, and can be replaced in the same manner by attaching to the jack and raising it to its proper position.

It will be obvious that the cradle can be used for a variety of purposes wherein a uniform and convenient lowering of the heavy transmission parts is required, and it should be specifically understood also that other slight modifications in the cradle could be made without departing from the essential spirit of our invention.

It will now be seen that we have provided the various advantages set forth in the objects of our invention with various other advantages being readily apparent.

Some changes may be made in the construction and arrangement of the parts of our invention without departing from the real spirit and purpose of our invention, and it is our intention to cover by our claims any modified forms of structure or use of mechanical equivalents which may be reasonably included within their scope.

We claim as our invention.

1. A transmission cradle comprising a longitudinally positioned bar, a transverse bar attached to said longitudinally positioned bar having vertically positioned portions, studs threadably engaged with said vertically positioned portions, said studs having pointed ends for bearing against a transmission, said longitudinally positioned bar including a further vertically positioned stud threadably engaged therewith, said further stud including an upper point for abutment with said transmission, a chain member detachably connected to one side of said longitudinally positioned bar for passing around said transmission and to securely retain the same, a securing member attached to said longitudinally positioned bar, means for firmly attaching said securing member to a standard lifting jack, including a substantially vertically positioned bolt member having a lower threaded end, said bolt member being received in the platform opening of said standard jack to be thereby attached thereto, a nut engaging said threaded bolt end for providing said attachment, whereby said cradle will be securely attached to said jack.

2. A transmission cradle comprising a longitudinally positioned bar, a transverse bar attached to said longitudinally positioned bar having vertically positioned portions, studs threadably engaged with said vertically positioned portions, said studs having pointed ends for bearing against a transmission, said longitudinally positioned bar including a further vertically positioned stud threadably engaged therewith, said further stud including an upper point for abutment with said transmission, a chain member detachably connected to one side of said longitudinally positioned bar for passing around said transmission and to securely retain the same, a securing member attached to said longitudinally positioned bar, means for firmly attaching said securing member to a standard lifting jack, including a substantially vertically positioned bolt member having a lower threaded end, said bolt member being received in the platform opening of said standard jack to be thereby attached thereto, a nut engaging said threaded bolt end for providing said attachment, whereby said cradle will be securely attached to said jack, said transverse bar including a point member attached thereto upon which said transmission will rest, said bolt member being pivotally clamped to said longitudinally positioned bar for providing adjustable angular positioning of said cradle.

References Cited in the file of this patent
UNITED STATES PATENTS

| | | |
|---|---|---|
| 1,603,307 | Anderson | Oct. 19, 1926 |
| 1,909,023 | Statz | May 16, 1933 |
| 2,621,891 | Marsh | Dec. 16, 1952 |
| 2,664,063 | Makruski | Dec. 29, 1953 |